(12) United States Patent
Matsuda et al.

(10) Patent No.: US 10,915,799 B2
(45) Date of Patent: Feb. 9, 2021

(54) IMAGE PROCESSING APPARATUS AND IMAGE RECOGNITION APPARATUS

(71) Applicant: FUJITSU LIMITED, Kawasaki (JP)

(72) Inventors: Yuji Matsuda, Kawasaki (JP); Eigo Segawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 16/298,044

(22) Filed: Mar. 11, 2019

(65) Prior Publication Data
US 2019/0205707 A1 Jul. 4, 2019

Related U.S. Application Data

(63) Continuation of application No. PCT/JP2017/046385, filed on Dec. 25, 2017.

(30) Foreign Application Priority Data

Jan. 10, 2017 (JP) .................... 2017-002108

(51) Int. Cl.
*G06K 9/00* (2006.01)
*G06K 9/66* (2006.01)
(Continued)

(52) U.S. Cl.
CPC ............... *G06K 9/66* (2013.01); *G06K 9/46* (2013.01); *G06K 9/6227* (2013.01); *G06K 9/6267* (2013.01)

(58) Field of Classification Search
CPC .......... G06K 9/66; G06K 9/64; G06K 9/6227; G06K 9/6267; G06K 9/62–726;
(Continued)

(56) References Cited

U.S. PATENT DOCUMENTS 4,926,491 A * 5/1990 Maeda ................. G06K 9/6255
382/155
5,276,769 A * 1/1994 Ueda ....................... G06N 3/08
706/25

(Continued)

FOREIGN PATENT DOCUMENTS

JP 7-160822 6/1995
JP 8-263660 10/1996
(Continued)

OTHER PUBLICATIONS

International Search Report dated Feb. 27, 2018 in corresponding International Patent Application No. PCT/JP2017/046385.
(Continued)

Primary Examiner — Jose L Couso
(74) Attorney, Agent, or Firm — Staas & Halsey LLP (57) ABSTRACT

An image processing apparatus includes a memory and a processor coupled to the memory. The processor is configured to classify each of a plurality of images into one of a plurality of groups based on a feature of each of the plurality of images. The processor is configured to store first information in the memory. A first recognition method is associated with a first group in the first information and images classified into the first group are correctly recognized by the first recognition method. The processor is configured to store second information in the memory. One of at least one second recognition method different from the first recognition method is associated with a second group in the second information and images classified into the second group are incorrectly recognized by the first recognition method.

9 Claims, 9 Drawing Sheets

(51) Int. Cl.
*G06K 9/46* (2006.01)
*G06K 9/62* (2006.01)

(58) Field of Classification Search
CPC ..... G06K 9/34; G06K 9/00402–00483; G06K 9/00523; G06K 9/00536–00563; G06K 9/00147; G06K 2009/00489; G06K 2209/01–05; G06T 7/00; G06T 7/33; G06T 7/35; G06T 2207/20084; G06F 16/35; G06F 16/5838; G06F 40/216; G06F 40/284; G06F 40/30; G06F 40/40; G06F 40/56; G06N 20/00; G06N 3/08–088; G06N 3/02; G06N 5/00–04; G06N 7/00–026
See application file for complete search history.

(56) References Cited

U.S. PATENT DOCUMENTS

| | | | | |
|---|---|---|---|---|
| 5,684,891 | A * | 11/1997 | Tanaka | G06K 9/34 382/176 |
| 6,104,833 | A * | 8/2000 | Naoi | G06K 9/6807 382/190 |
| 7,646,913 | B2 * | 1/2010 | Abdulkader | G06K 9/6219 382/187 |
| 7,865,018 | B2 * | 1/2011 | Abdulkader | G06K 9/00429 382/115 |
| 8,014,591 | B2 * | 9/2011 | Baker | G06K 9/6262 382/159 |
| 8,577,131 | B1 * | 11/2013 | Li | G06K 9/6256 382/157 |
| 2003/0113016 | A1 | 6/2003 | Naoi et al. | |
| 2005/0038644 | A1 * | 2/2005 | Napper | G06K 9/00852 704/9 |
| 2009/0070415 | A1 * | 3/2009 | Kishi | G06F 16/00 709/203 |
| 2011/0255789 | A1 * | 10/2011 | Neogi | G06K 9/48 382/190 |
| 2017/0178060 | A1 * | 6/2017 | Schwartz | G06K 9/6267 |

FOREIGN PATENT DOCUMENTS

| | | |
|---|---|---|
| JP | 10-154204 | 6/1998 |
| JP | 10-240930 | 9/1998 |
| JP | 11-282964 | 10/1999 |
| JP | 2000-155803 | 6/2000 |
| JP | 2005-115525 | 4/2005 |
| JP | 2009-129253 | 6/2009 |
| JP | 2016-18353 | 2/2016 |
| JP | 2016-62249 | 4/2016 |
| WO | WO 98/36372 | 8/1998 |

OTHER PUBLICATIONS

Written Opinion of the International Searching Authority dated Feb. 27, 2018 in corresponding International Patent Application No. PCT/JP2017/046385.

Office Action dated May 12, 2020, in corresponding Japanese Patent Application No. 2017-002108.

Decision of Refusal, dated Dec. 22, 2020, in corresponding Japanese Application No. 2017-002108 (6 pp.).

* cited by examiner

FIG. 2

| CORRECT ANSWER LABEL | IMAGE |
|---|---|
| A | XXX |
| B | YYY |
| ... | ... |
| T | ZZZ |

FIG. 3

| GROUP ID | CORRECT ANSWER LABEL | IMAGE |
|---|---|---|
| 001 | A | XXX |
| 004 | B | YYY |
| ... | ... | ... |

| SELECTION CONDITION ID | FIRST FEATURE MINIMUM VALUE | FIRST FEATURE MAXIMUM VALUE | SECOND FEATURE MINIMUM VALUE | SECOND FEATURE MAXIMUM VALUE |
|---|---|---|---|---|
| 001 | 0 | 127 | 0 | 0.5 |
| ... | ... | ... | ... | ... |
| ... | ... | ... | ... | ... |

IMAGE PROCESSING APPARATUS AND IMAGE RECOGNITION APPARATUS

CROSS-REFERENCE TO RELATED APPLICATIONS

This application is a continuation application of International Application PCT/JP2017/046385 filed on Dec. 25, 2017 and designated the U.S., the entire contents of which are incorporated herein by reference. The International Application PCT/JP2017/046385 is based upon and claims the benefit of priority of the prior Japanese Patent Application No. 2017-002108, filed on Jan. 10, 2017, the entire contents of which are incorporated herein by reference.

FIELD

The embodiments discussed herein are related to an image processing apparatus and an image recognition apparatus.

BACKGROUND

A character reading method using character recognition processes of two methods is known. In the character reading method, the character recognition processes of two methods are performed in series and the second recognition processing is performed on the character image data for which predetermined confidence rating is not acquired in the first recognition process. Furthermore, in a case where the predetermined confidence rating is also not acquired by the second recognition process, the character code is output when the character codes output by the two recognition processes are the same.

A character recognition apparatus using a plurality of character recognition units is known. In the character recognition apparatus, each of the plurality of character recognition units receives an image from an image storage unit and outputs a provisional character recognition result. A recognition result integration unit integrates these provisional character recognition results (character codes) according to some logical rules acquired by learning in a logical rule generation unit in advance, and outputs the integrated (final) character recognition result. A logical rule integration unit generates logical rules simplified as much as possible by learning, by using a set of case data (that is, a pair of the provisional character recognition results of the character recognition units and a correct answer) received from a case data storage unit, and sends the generated result to the recognition result integration unit.

A pattern recognition method is known in which recognition accuracy is improved by combining two recognition systems. In the pattern recognition method, a first verification vector related to a feature vector extracted from a training pattern of a predetermined class is verified by a classification dictionary of a first classification unit to acquire a first difference value. Next, a conversion vector is determined by a rival pattern of each class determined by the first difference value and the training pattern that belongs to the class. A second verification vector related to a transformed feature vector acquired by transforming the feature vector by the conversion vector is verified by a classification dictionary of a second classification unit to acquire a second difference value. Next, a class of the training pattern is determined based on the first and second difference values. A class of every training pattern that belongs to the predetermined class is determined by repeating the above. The classification dictionary of the second classification unit is optimized so as to increase a recognition rate of the entire training patterns. A class is determined for a pattern of an unknown class by using the conversion vector and the classification dictionary acquired by this learning.

An apparatus which selects, as a feature amount used for a classification process of identifying whether or not a target data is data having specific contents, a feature amount having a high combination effect depending on the specific contents and also determines a classification condition corresponding to each feature amount, is known. In this apparatus, for each of a plurality of the feature amounts available for the classification process, a corresponding classifier is created based on a sample data group. The classifier having high classification accuracy is sequentially selected, and a plurality of the classifier groups are defined. A group having high composite classification accuracy as the entire classifier group is selected from the plurality of the defined classifier groups. Based on classifiers configuring the selected classifier group, a type and a classification condition of the feature amount used for the classification process are determined.

A classification dictionary learning apparatus capable of shortening a classification time while suppressing the deterioration of the classification accuracy is known. In the classification dictionary learning apparatus, a plurality of classifiers are learned by using data values each belong to any of a plurality of classes. The plurality of classifiers classify each of the data values into one of a plurality of classes. Based on a class to which a learning sample belongs by wrong classification and a plurality of optimization index coefficients representing the magnitude of the contribution to an optimization index representing the classification accuracy, the classification dictionary learning apparatus calculates the optimization index of each of the plurality of the classifiers. The classification dictionary learning apparatus selects, as a weak classifier, a classifier representing the optimization index having the highest classification accuracy among the classifiers, and adds the weak classifier to the classification dictionary. The classification dictionary learning apparatus performs updating of the optimization index coefficients based on a rule in response to the addition of the weak classifier to the classification dictionary.

An information processing apparatus capable of improving a recognized correct answer rate and incompatibility even in a case where a plurality of recognition methods are adopted is known. In the information processing apparatus, result data including the correctness of each recognition result acquired by applying the plurality of recognition methods to test data and an index value indicating the accuracy of recognition, is acquired. The information processing apparatus acquires an allowable value of an incompatibility rate determined based on the number of recognition results changed from a correction to an error by switching the recognition methods. The information processing apparatus refers to the result data, and generates a selection table indicating which recognition method among the plurality of recognition methods is to be selected for each index value so that the recognition accuracy becomes best within a range of the allowable value.

Related techniques are disclosed in, for example, Japanese Laid-open Patent Publication No. 2000-155803, Japanese Laid-open Patent Publication No. 11-282964, Japanese Laid-open Patent Publication No. 10-240930, Japanese Laid-open Patent Publication No. 2005-115525, Japanese Laid-open Patent Publication No. 2016-062249, and Japanese Laid-open Patent Publication No. 2016-018353.

In an image recognition process, a recognition method different from a predetermined recognition method may be introduced. There is a possibility that overall recognition accuracy is improved by introducing different recognition methods instead of the predetermined recognition method. However, there is a possibility that erroneous recognition occurs, in a case where a different recognition method is employed, in images that are recognized appropriately in the predetermined recognition method.

SUMMARY

According to an aspect of the present invention, provided is an image processing apparatus including a memory and a processor coupled to the memory. The processor is configured to classify each of a plurality of images into one of a plurality of groups based on a feature of each of the plurality of images. The processor is configured to store first information in the memory. A first recognition method is associated with a first group in the first information and images classified into the first group are correctly recognized by the first recognition method. The processor is configured to store second information in the memory. One of at least one second recognition method different from the first recognition method is associated with a second group in the second information and images classified into the second group are incorrectly recognized by the first recognition method.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, the embodiments will be described in detail with reference to the drawings.

First Embodiment

Image Processing Apparatus

Figure 1:
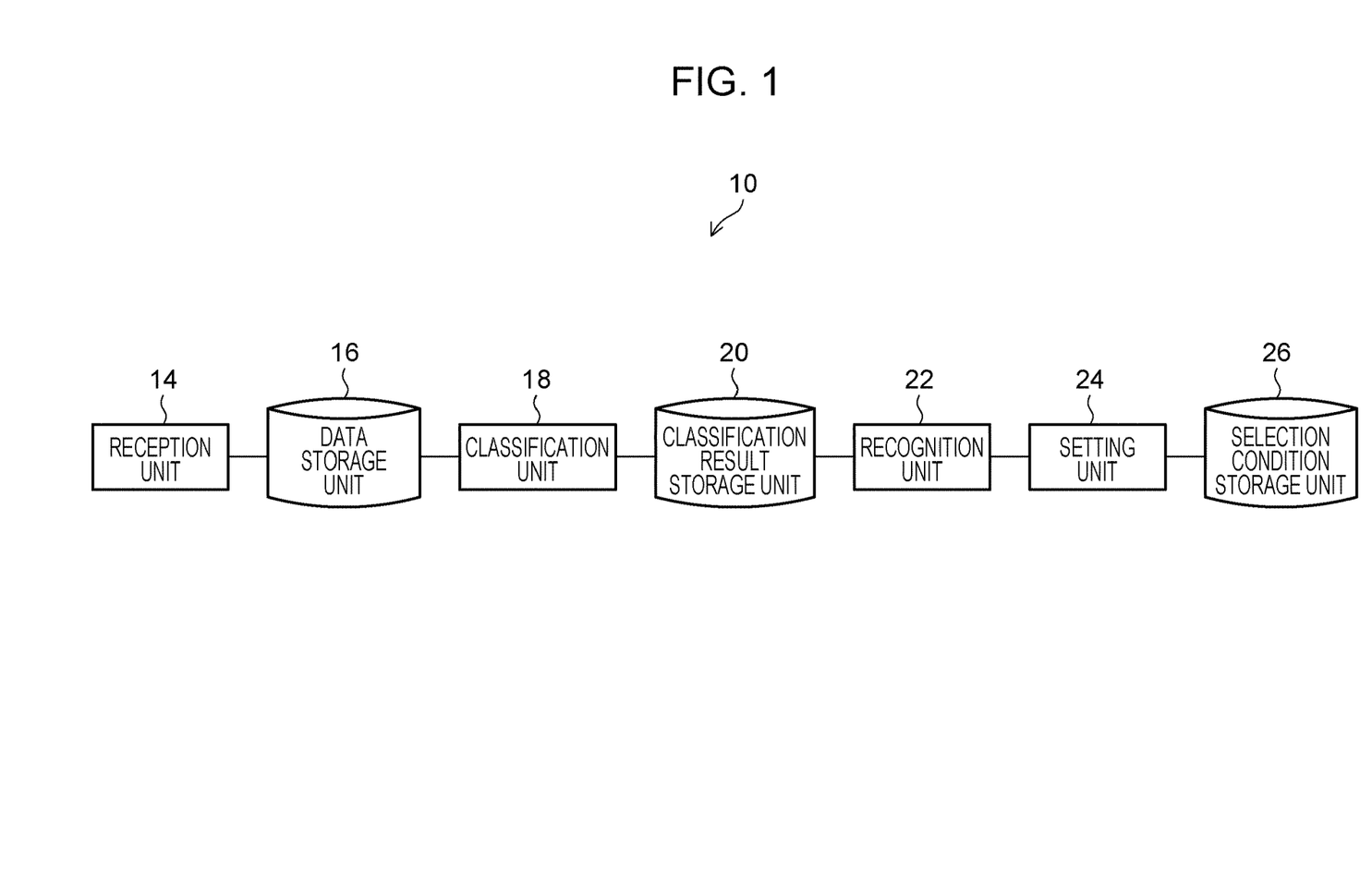
FIG. 1 is a diagram illustrating an exemplary functional configuration of an image processing apparatus according to a first embodiment.

As illustrated in FIG. 1, an image processing apparatus 10 according to a first embodiment includes a reception unit 14, a data storage unit 16, a classification unit 18, a classification result storage unit 20, a recognition unit 22, a setting unit 24, and a selection condition storage unit 26. The setting unit 24 is an example of a control unit.

The reception unit 14 receives input of learning data for which a correct answer of an image is known. The correct answer of an image indicates a correct answer to be acquired as result information of a recognition process on the image. For example, in a case where an image is a character image, a character code acquired by performing character recognition of the character image may be used as a correct answer label. A correct answer label indicating the correct answer of the image is attached to each of images of learning data. The reception unit 14 stores a plurality of received learning data in the data storage unit 16.

Figure 2:
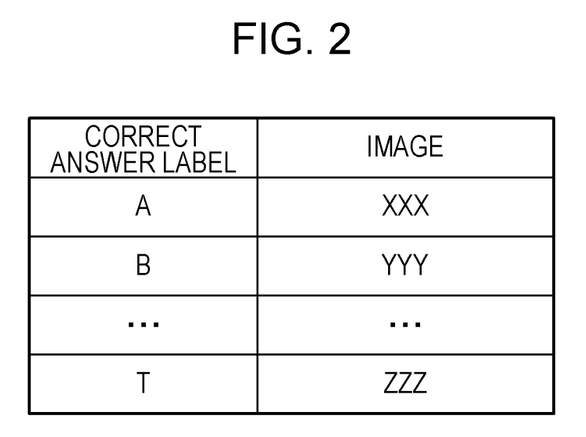
FIG. 2 is a diagram illustrating an example of a table stored in a data storage unit.

In the data storage unit 16, a plurality pieces of learning data received by the reception unit 14 are stored. For example, in the data storage unit 16, an image and a correct answer label are stored in association with each other in tabular form. FIG. 2 illustrates an example of a table stored in the data storage unit 16. As illustrated in FIG. 2, for each learning data, a correct answer label and an image are stored in association with each other in the table.

The classification unit 18 classifies each of the images of the plurality pieces of learning data stored in the data storage unit 16 into one of a plurality of groups based on a feature of each image. The classification unit 18 stores each of the images classified into the plurality of groups in the classification result storage unit 20. For example, average luminance, average edge intensity, and the like may be used as the feature of an image.

For example, in a case where images having 256 gradations of a luminance value are classified into two groups based on an average luminance, images having an average luminance value 0 to 127 and images having an average luminance value 128 to 255 may be classified into different groups, with a threshold luminance value 128. In a case where images are classified into two groups based on an average edge intensity calculated by using a Sobel filter in edge extraction, the images may be classified into two groups based on an average edge intensity after normalizing the average edge intensity from 0 to 1 and setting a threshold to 0.5.

Figure 3:
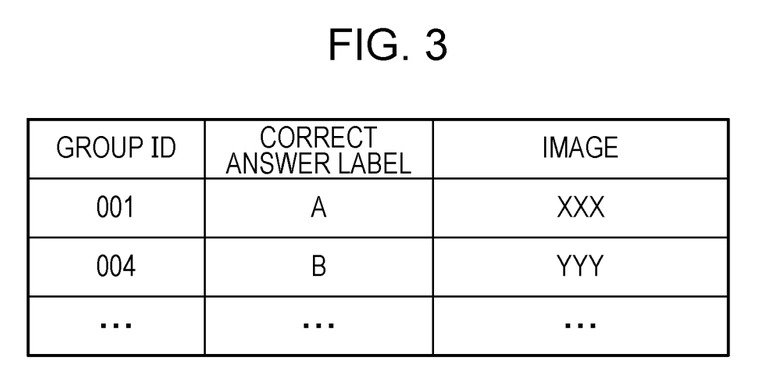
FIG. 3 is a diagram illustrating an example of a table stored in a classification result storage unit.

In the classification result storage unit 20, a plurality of images classified into one of groups by the classification unit 18 are stored. FIG. 3 illustrates an example of a table stored in the classification result storage unit 20. For example, in the classification result storage unit 20, as illustrated in FIG. 3, an image, a group identifier (ID) indicating identification information of a group to which the image is classified, and a correct answer label are stored in association with each other in tabular form.

The recognition unit 22 recognizes each of the images, which are classified into one of the plurality of groups and stored in the classification result storage unit 20, by employing an old method of recognition that is an example of a predetermined recognition method. The recognition unit 22 acquires a correct answer rate on image recognition for each group in a case where the old method of recognition is employed. For example, the recognition unit 22 determines, for each of the images stored in the classification result storage unit 20, whether recognition succeeds or fails based on the correct answer label and a recognition result, and acquires a correct answer rate for each group, based on the success or failure of each image that belongs to each group. More specifically, the recognition unit 22 may acquire, as the correct answer rate of a group, a rate of images in the group for which recognition succeeds against the number of images that belong to the group.

The setting unit 24 performs, based on the correct answer rate for each group acquired by the recognition unit 22, a control of enabling a change to a new method of recognition, which is an example of a recognition method different from the old method of recognition, for a group for which image recognition by the old method fails. Specifically, the setting unit 24 sets to perform recognition by the new method for the group for which image recognition by the old method fails. For example, the setting unit 24 identifies a group for which the correct answer rate becomes zero in a case where the old method of recognition is employed, and sets a selection condition of feature for employing the new method of recognition based on the feature of each image that belongs to the group.

Figure 4:
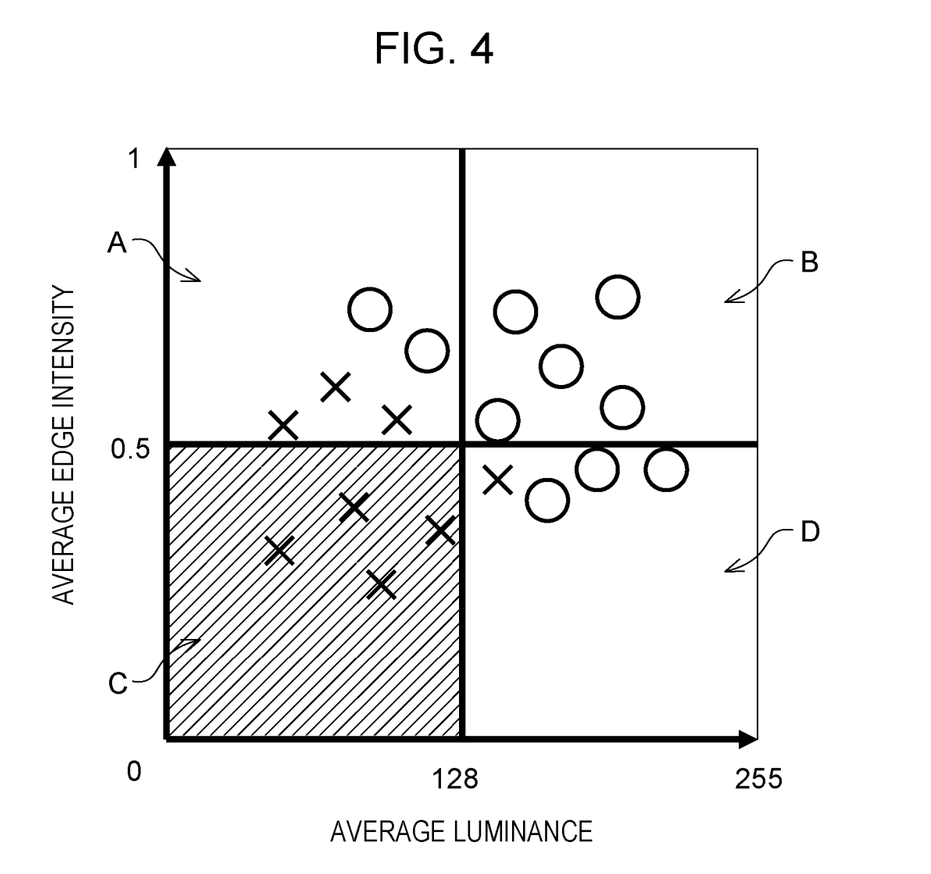
FIG. 4 is a diagram illustrating an example of a relationship between a feature of an image and a recognition result in a case where an old method of recognition is employed.

FIG. 4 illustrates an example of a relationship between a feature of an image and the success or failure of a recognition result in a case where an old method of recognition is employed. In FIG. 4, based on the average luminance and the average edge intensity of an image, an example in which the feature of an image is classified into four regions (A, B, C, and D) is illustrated. In the example illustrated in FIG. 4, an example in which a symbol "o" or "x" is plotted at a point corresponding to each feature of an image is illustrated, the image corresponding to a feature illustrated with "o" indicates that recognition succeeds, and "x" indicates that recognition fails.

As illustrated in FIG. 4, all symbols are "o" in the B region, which indicates that recognition with high accuracy is performed by the old method of recognition. Meanwhile, "o" and "x" are mixed in the A region and the D region. For the A region, the correct answer rate is 40% in a case where the old method of recognition is employed. For the D region, the correct answer rate is 75% in a case where the old method of recognition is employed. All symbols are "x" in the C region, which indicates that recognition of the entire images fails.

In the present embodiment, recognition by a new method of recognition is set to be performed for images that belong to a group for which recognition by the old method fails. Therefore, in the example illustrated in the FIG. 4, the selection condition of feature is set such that the new method of recognition is employed for images in the C region. In the present embodiment, the old method of recognition is replaced with the new method of recognition, only for a group such that recognition of entire images that belong to the group are failed by the old method. When the recognition method transitions to the new method for a group including an image of which recognition by the old method succeeds and an image of which recognition by the old method fails, there may be a case where recognition of an image by the new method fails while recognition of the image by the old method succeeds. Therefore, in the present embodiment, the recognition method transitions to the new method only for a group such that recognition of the entire images that belong to the group are failed by the old method. Accordingly, for example, in the example of the FIG. 4, recognition is performed by the old method without transitioning to the new method of recognition, for the group having the correct answer rate 40% and the group having the correct answer rate 75%. By transitioning the recognition method to the new method only for the group for which recognition by the old method fails, the recognition accuracy is improved while securing correct recognition of images that are correctly recognized by the old method.

The setting unit 24 stores the selection condition of feature for employing the new method of recognition in a selection condition table of the selection condition storage unit 26.

Figure 5:
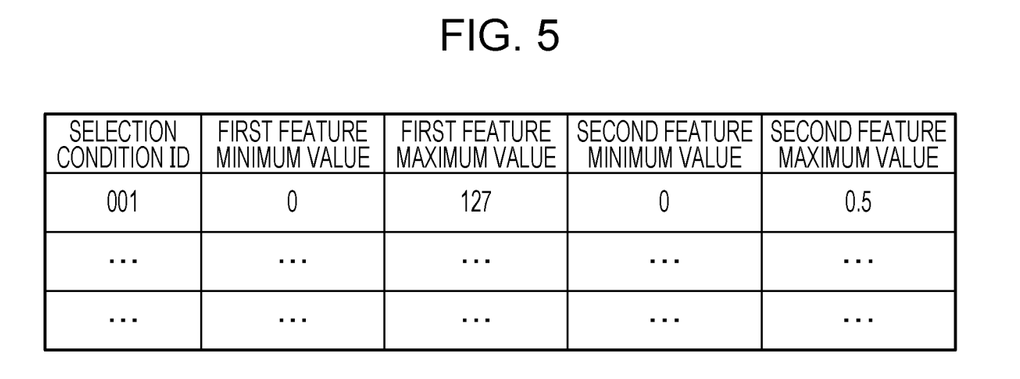
FIG. 5 is a diagram illustrating an example of a selection condition table.

In the selection condition storage unit 26, the selection condition of feature for employing the new method of recognition is stored. FIG. 5 illustrates an example of the selection condition table stored in the selection condition storage unit 26. The example of the selection condition table illustrated in FIG. 5 is set, in the first line, to perform recognition by the new method for the C region in the example of the FIG. 4. As illustrated in FIG. 5, a selection condition ID indicating identification information of the selection condition, a range of average luminance that is the first feature, and a range of average edge intensity that is the second feature, are stored in association with each other in the selection condition table.

Image Recognition Apparatus

Figure 6:
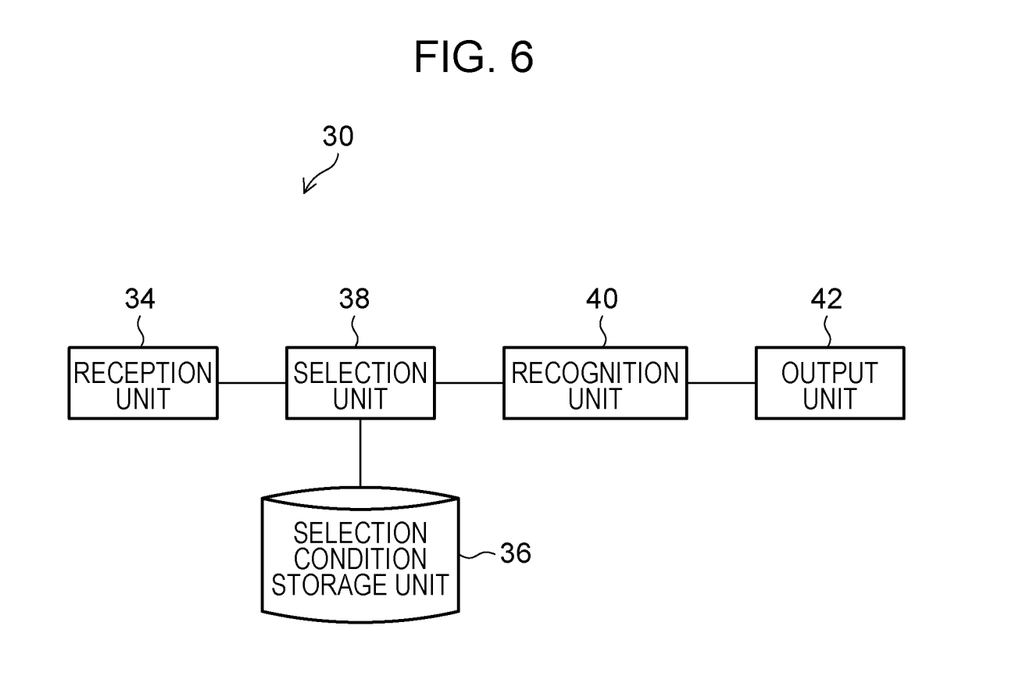
FIG. 6 is a diagram illustrating an exemplary functional configuration of an image recognition apparatus according to a first embodiment.

As illustrated in FIG. 6, an image recognition apparatus 30 according to the first embodiment includes a reception unit 34, a selection condition storage unit 36, a selection unit 38, a recognition unit 40, and an output unit 42.

The reception unit 34 receives input of a recognition target image.

In the selection condition storage unit 36, the selection condition table set by the image processing apparatus 10 is stored. The selection condition table stored in the selection condition storage unit 36 is identical to the selection condition table stored in the selection condition storage unit 26 of the image processing apparatus 10.

Based on a feature of an image received by the reception unit 34, the selection unit 38 determines whether or not the image belongs to a group for which the new method of recognition is to be employed. The selection unit 38 refers to the selection condition table stored in the selection condition storage unit 36, and selects the old method of recognition or the new method of recognition depending on a group to which the image belongs.

For example, in a case where the selection condition table illustrated in the FIG. 5 is used, the selection unit 38 extracts average luminance and average edge intensity as a feature from an image received by the reception unit 34. Next, the selection unit 38 refers to the selection condition table illustrated in the FIG. 5, and determines whether or not the image belongs to a group of images having a value 0 to 127 of average luminance (as the first feature) and a value 0 to 0.5 of average edge intensity (as the second feature). In a case where the image belongs to the group of images having a value 0 to 127 of average luminance and a value 0 to 0.5 of average edge intensity, the selection unit 38 selects the new method of recognition. In a case where the image does not belong to the group of images having a value 0 to 127 of average luminance and a value 0 to 0.5 of average edge intensity, the selection unit 38 selects the old method of recognition.

The recognition unit 40 performs recognition of the image received by the reception unit 34 by employing the recognition method selected by the selection unit 38.

The output unit 42 outputs the recognition result acquired by the recognition unit 40.

Figure 7:
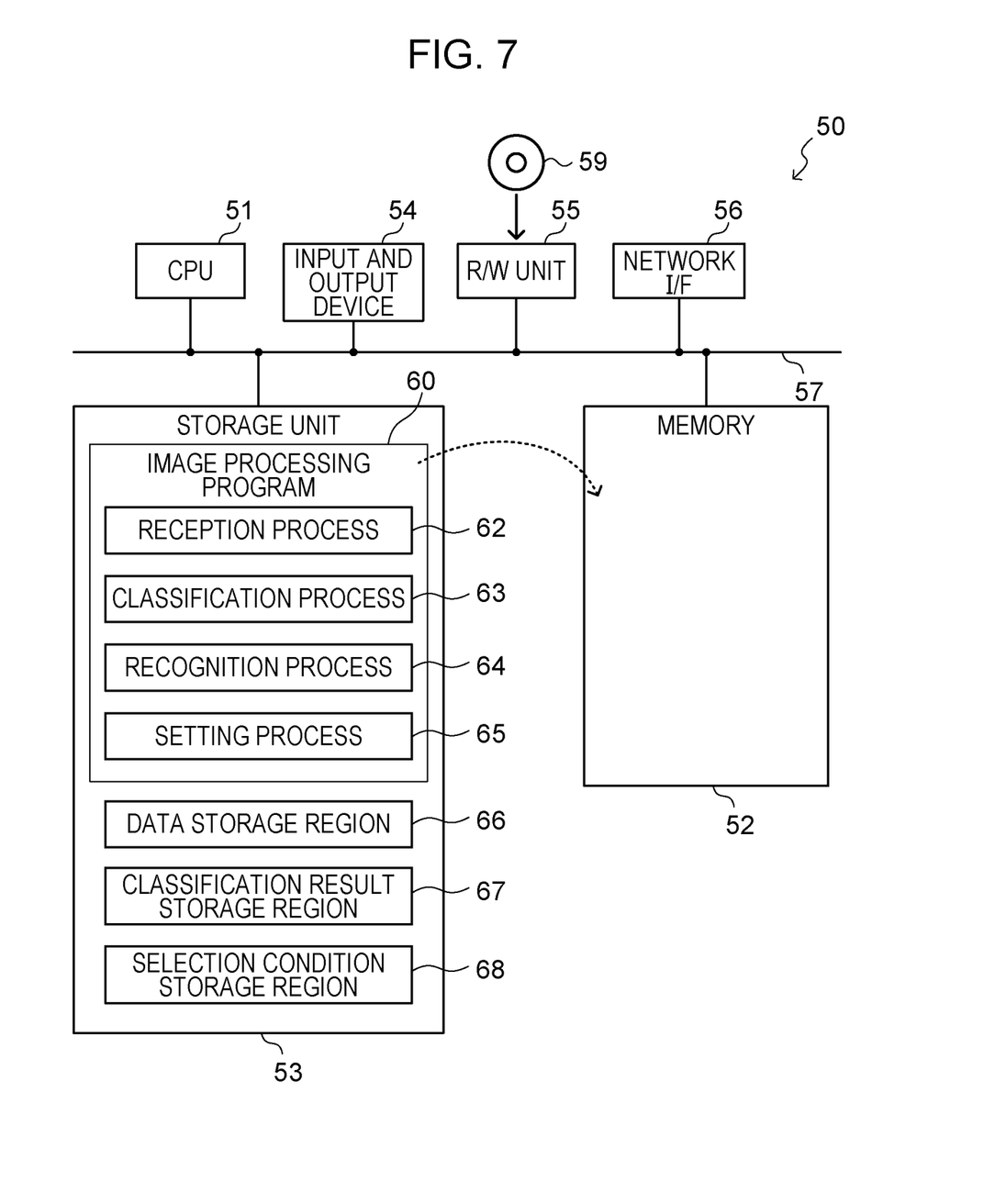
FIG. 7 is a diagram illustrating an exemplary configuration of a computer that functions as an image processing apparatus according to a first embodiment.

For example, the image processing apparatus 10 may be implemented by a computer 50 illustrated in FIG. 7. The computer 50 includes a central processing unit (CPU) 51, a memory 52 as a temporary storage region, and a non-volatile storage unit 53. In addition, the computer 50 includes an input and output device 54 such as a display device and an input device, and a read/write (R/W) unit 55 for controlling reading and writing of data on a recording medium 59. In addition, the computer 50 includes a network interface (I/F) 56 coupled to a network such as the Internet. The CPU 51, the memory 52, the storage unit 53, the input and output device 54, the R/W unit 55, and the network I/F 56 are coupled to each other via a bus 57.

The storage unit 53 may be implemented by a hard disk drive (HDD), a solid state drive (SSD), a flash memory, and the like. In the storage unit 53 as a recording medium, an image processing program 60 for functioning the computer 50 as the image processing apparatus 10 is stored. The image processing program 60 includes a reception process 62, a classification process 63, a recognition process 64, and a setting process 65. In addition, the storage unit 53 includes a data storage region 66 in which information configuring the data storage unit 16 is stored, a classification result storage region 67 in which information configuring the classification result storage unit 20 is stored, and a selection condition storage region 68 in which information configuring the selection condition storage unit 26 is stored.

The CPU 51 reads the image processing program 60 from the storage unit 53, loads the image processing program 60 to the memory 52, and sequentially performs processes included in the image processing program 60. The CPU 51 operates as the reception unit 14 illustrated in FIG. 1 by performing the reception process 62. The CPU 51 operates as the classification unit 18 illustrated in FIG. 1 by performing the classification process 63. The CPU 51 operates as the recognition unit 22 illustrated in FIG. 1 by performing the recognition process 64. The CPU 51 operates as the setting unit 24 illustrated in FIG. 1 by performing the setting process 65. The CPU 51 reads information of the data storage unit 16 from the data storage region 66 and loads the information to the memory 52. The CPU 51 reads information of the classification result storage unit 20 from the classification result storage region 67 and loads the information to the memory 52. The CPU 51 reads information of the selection condition storage region 68 from the selection condition storage unit 26 and loads the information to the memory 52. By executing the image processing program 60, the computer 50 functions as the image processing apparatus 10. Therefore, a processor that executes the image processing program 60 that is software, is hardware.

The functions implemented by the image processing program 60 may be implemented by a semiconductor integrated circuit, more specifically, an application specific integrated circuit (ASIC) and the like.

Figure 8:
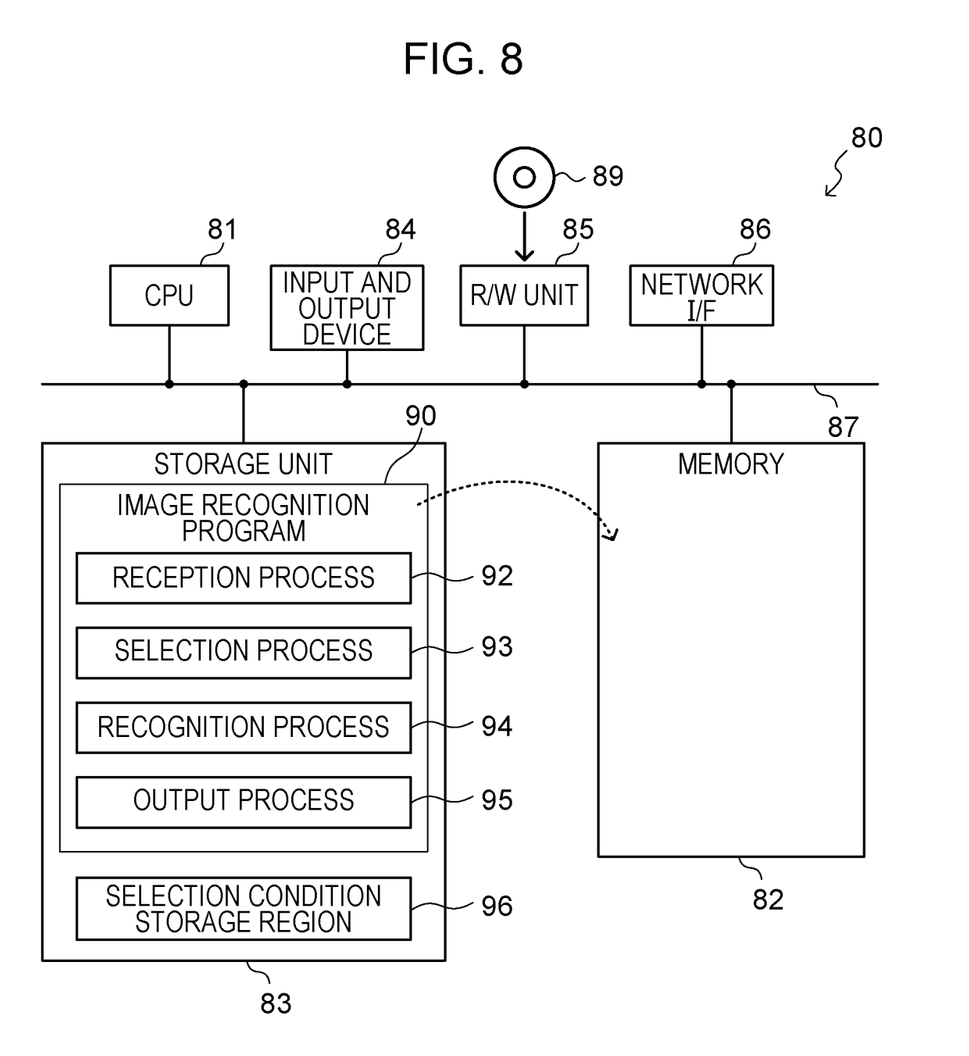
FIG. 8 is a diagram illustrating an exemplary configuration of a computer that functions as an image recognition apparatus according to a first embodiment.

For example, the image recognition apparatus 30 may be implemented by a computer 80 illustrated in FIG. 8. The computer 80 includes a CPU 81, a memory 82 as the temporary storage region, and a non-volatile storage unit 83. In addition, the computer 80 includes an input and output device 84 such as a display device and an input device, and a R/W unit 85 for controlling reading and writing of data on a recording medium 89. In addition, the computer 80 includes a network I/F 86 coupled to a network such as the Internet. The CPU 81, the memory 82, the storage unit 83, the input and output device 84, the R/W unit 85, and the network I/F 86 are coupled to each other via a bus 87.

The storage unit 83 may be implemented by an HDD, an SSD, a flash memory, and the like. In the storage unit 83 as a recording medium, an image recognition program 90 for functioning the computer 80 as the image recognition apparatus 30, is stored. The image recognition program 90 includes a reception process 92, a selection process 93, a recognition process 94, and an output process 95. The storage unit 83 includes a selection condition storage region 96 in which information configuring the selection condition storage unit 36 is stored.

The CPU 81 reads the image recognition program 90 from the storage unit 83, loads the image recognition program 90 to the memory 82, and sequentially performs processes included in the image recognition program 90. The CPU 81 functions as the reception unit 34 illustrated in FIG. 6 by performing the reception process 92. The CPU 81 functions as the selection unit 38 illustrated in FIG. 6 by performing the selection process 93. The CPU 81 functions as the recognition unit 40 illustrated in FIG. 6 by performing the recognition process 94. The CPU 81 functions as the output unit 42 illustrated in FIG. 6 by performing the output process 95. The CPU 81 reads information of the selection condition storage unit 36 from the selection condition storage region 96 and loads the information to the memory 82. By executing the image recognition program 90, the computer 80 functions as the image recognition apparatus 30. Therefore, a processor executing the image recognition program 90 that is software, is hardware.

Functions implemented by the image recognition program 90 may be also implemented by a semiconductor integrated circuit, more specifically, an ASIC and the like.

Next, the operation of the image processing apparatus 10 and the image recognition apparatus 30 according to the embodiment will be described.

First, a setting process of setting the selection condition of feature will be described. In the image processing apparatus 10, when a plurality pieces of learning data are input, the selection condition setting process illustrated in FIG. 9 is performed in the image processing apparatus 10.

Figure 9:
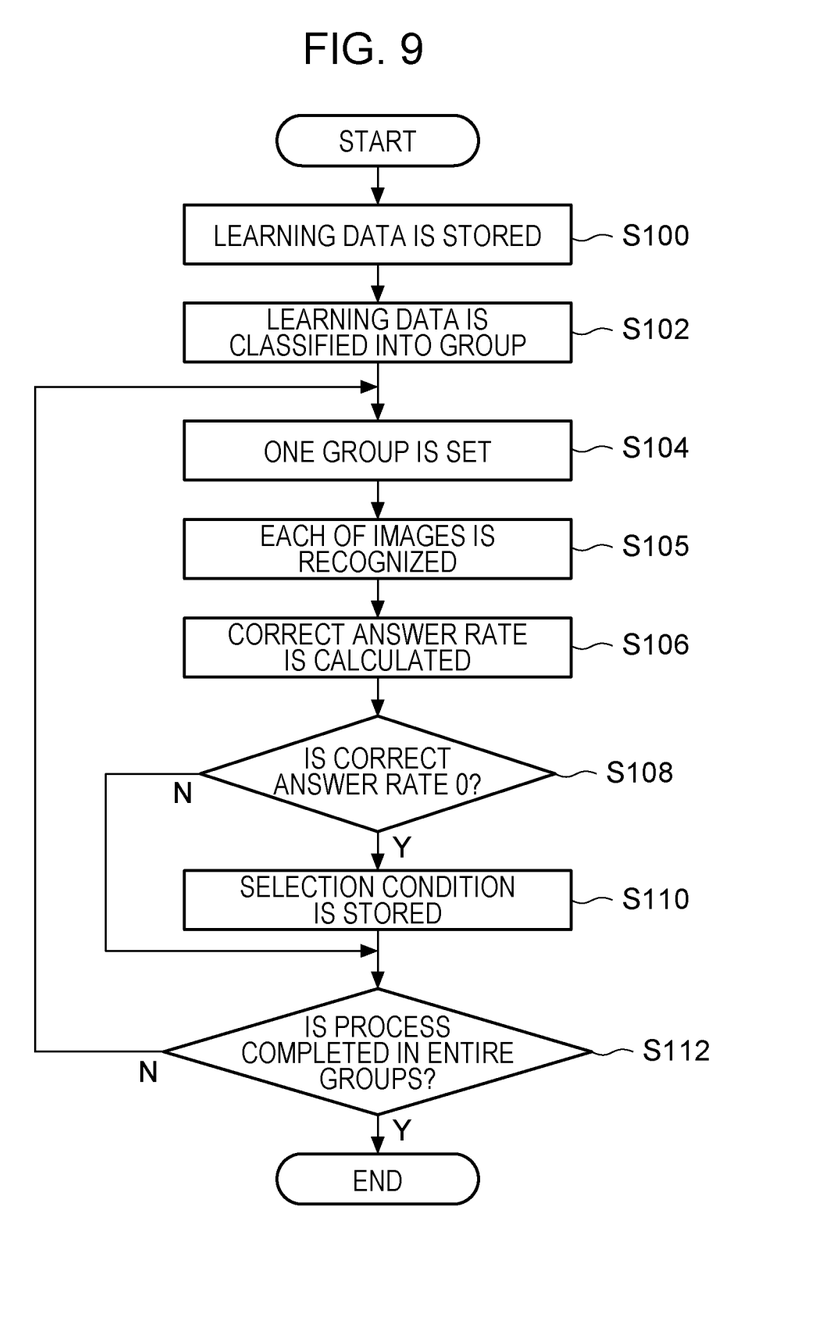
FIG. 9 is a flowchart illustrating an example of a selection condition setting process according to a first embodiment.

In step S100 of the selection condition setting process illustrated in FIG. 9, the reception unit 14 stores the received plurality pieces of learning data in the data storage unit 16.

In step S102, the classification unit 18 classifies each of the images of the plurality pieces of learning data stored in the data storage unit 16 in the step S100 into one of a plurality of groups based on the feature of the image. The classification unit 18 stores each of the images classified to the plurality of groups in the classification result storage unit 20.

In step S104, the recognition unit 22 sets one group from the plurality of groups stored in the classification result storage unit 20 in the step S102.

In step S105, the recognition unit 22 recognizes each of the images that belong to the group set in the step S104 by employing the old method of recognition.

In step S106, the recognition unit 22 calculates a correct answer rate of the group based on a correct answer label of each image that belongs to the group set in the step S104 stored in the classification result storage unit 20 and the recognition result of each image acquired in the step S105.

In step S108, the setting unit 24 determines whether or not the correct answer rate of the group calculated in the step S106 is 0. In a case where the correct answer rate of the group is 0, the process proceeds to step S110. In a case where the correct answer rate of the group is not 0, the process proceeds to step S112.

In step S110, the selection condition of feature corresponding to the group set in the step S104 is stored in the selection condition storage unit 26.

In step S112, the setting unit 24 determines whether or not processes of the step S104 to the step S110 are performed for the entire groups classified in the step S102. In a case where the processes of the step S104 to the step S110 are performed for the entire groups, the selection condition setting process is completed. In a case where a group for which the processes of the step S104 to the step S110 are not performed is present, the process returns to step S104.

For example, the process of step S105 may be performed before the loop starting with step S104, that is, the correct answer rate for each group may be calculated after performing the recognition process on all images.

Figure 10:
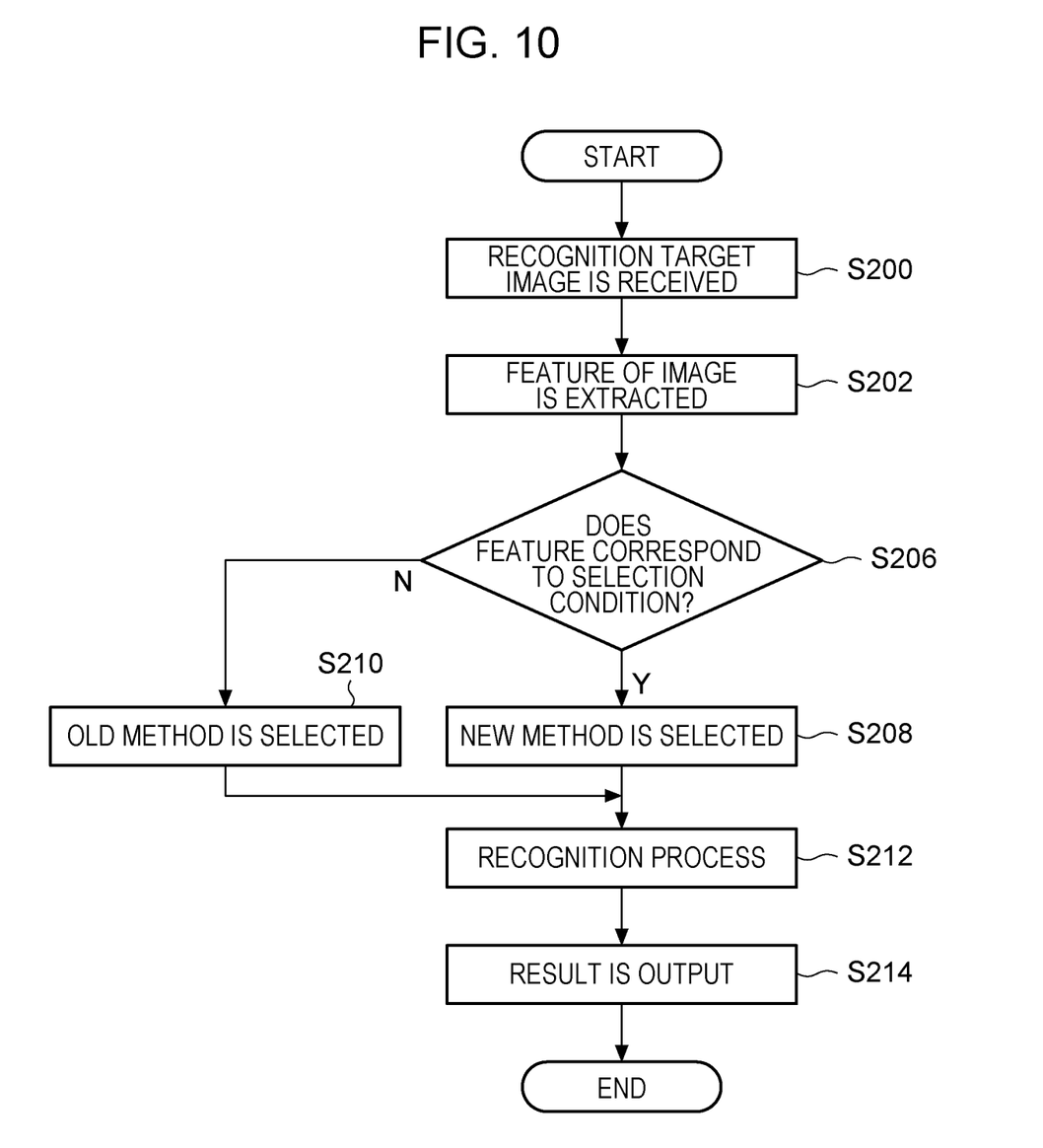
FIG. 10 is a flowchart illustrating an example of an image recognition process in a first embodiment.

Next, an image recognition process will be described. In the image recognition apparatus 30, when the selection condition table set by the image processing apparatus 10 is input, the selection condition table is stored in the selection condition storage unit 36. When a recognition target image is input, the image recognition process illustrated in FIG. 10 is performed in the image recognition apparatus 30. Hereinafter, each process will be described in detail.

In step S200, the reception unit 34 receives the recognition target image.

In step S202, the selection unit 38 extracts the feature of the image received in the step S200.

In step S206, the selection unit 38 refers to the selection condition table stored in the selection condition storage unit 36, and determines whether or not the feature of the image extracted in the step S202 corresponds to a feature of the selection condition table. In a case where the feature of the image corresponds to the feature of the selection condition table, the process proceeds to step S208. In a case where the feature of the image does not correspond to the feature of the selection condition table, the process proceeds to step S210.

In step S208, the selection unit 38 selects the new method of recognition.

In step S210, the selection unit 38 selects the old method of recognition.

In step S212, the recognition unit 40 performs recognition of the image received in the step S200 by employing the recognition method selected in the step S208 or step S210.

In step S214, the output unit 42 completes the image recognition process by outputting the recognition result acquired in the step S212.

As described above, the image processing apparatus according to the first embodiment classifies each of the plurality of images into one of the plurality of groups depending on the feature of an image, and recognizes, for each of the plurality of groups, each of the images classified into the relevant group by employing the old method of recognition. The image processing apparatus sets that recognition of images that belong to a group is performed by employing the new method when recognition of the images by the old method completely fails. As a result, when a new method of recognition is introduced, the selection condition may be set to improve the recognition accuracy as a whole while suppressing failure of recognition by the new method on an image that is correctly recognized by the old method.

The image recognition apparatus according to the first embodiment identifies a group to which a recognition target image belongs based on a feature of the recognition target image, and performs recognition of the recognition target image by employing the recognition method set in advance for the identified group by the image processing apparatus. As a result, when a new method of recognition different from the old method of recognition is introduced, the recognition accuracy as a whole may be improved while suppressing that the new method fails to recognize an image that is correctly recognized by the old method.

In addition, the recognition accuracy may be improved while securing correct recognition of images that are correctly recognized by the old method.

Second Embodiment

Next, a second embodiment will be described. In the second embodiment, a plurality of new methods of recognition are present and a setting method of setting a recognition method is different from that of the first embodiment. Since a configuration of the second embodiment is similar to the configuration of the first embodiment, the same symbols are assigned and the description thereof is omitted.

The recognition unit 22 of the image processing apparatus 10 according to the second embodiment determines a group for which recognition by the old method fails among groups stored in the classification result storage unit 20. The recognition unit 22 recognizes each of images that belong to the determined group by employing each of the plurality of new methods of recognition. The recognition unit 22 acquires, for each of the groups for which recognition by the old method fails, a correct answer rate of images that belong to the group for each of the plurality of new methods of recognition.

The setting unit 24 of the image processing apparatus 10 according to the second embodiment controls, based on each correct answer rate acquired by the recognition unit 22, which one of the plurality of new methods of recognition is to be employed for recognition of images that belong to the group for which recognition by the old method fails. The setting unit 24 sets which one of the plurality of new methods of recognition is employed to perform recognition.

Specifically, the setting unit 24 selects, for each of the groups for which recognition by the old method fails, a new method of recognition having the highest correct answer rate among the correct answer rates acquired by the recognition unit 22 with respect to the plurality of new methods of recognition. Next, the setting unit 24 sets, for each of the groups for which recognition by the old method fails, the new method of recognition to be employed to recognize images that belong to the relevant group and the selection condition of feature for employing the new method. The setting unit 24 stores the new method of recognition to be employed to recognize images that belong to the group for which recognition by the old method fails and the selection condition of feature for employing the new method in the selection condition table of the selection condition storage unit 26.

Next, the operation of the image processing apparatus 10 according to the second embodiment will be described.

Figure 11:
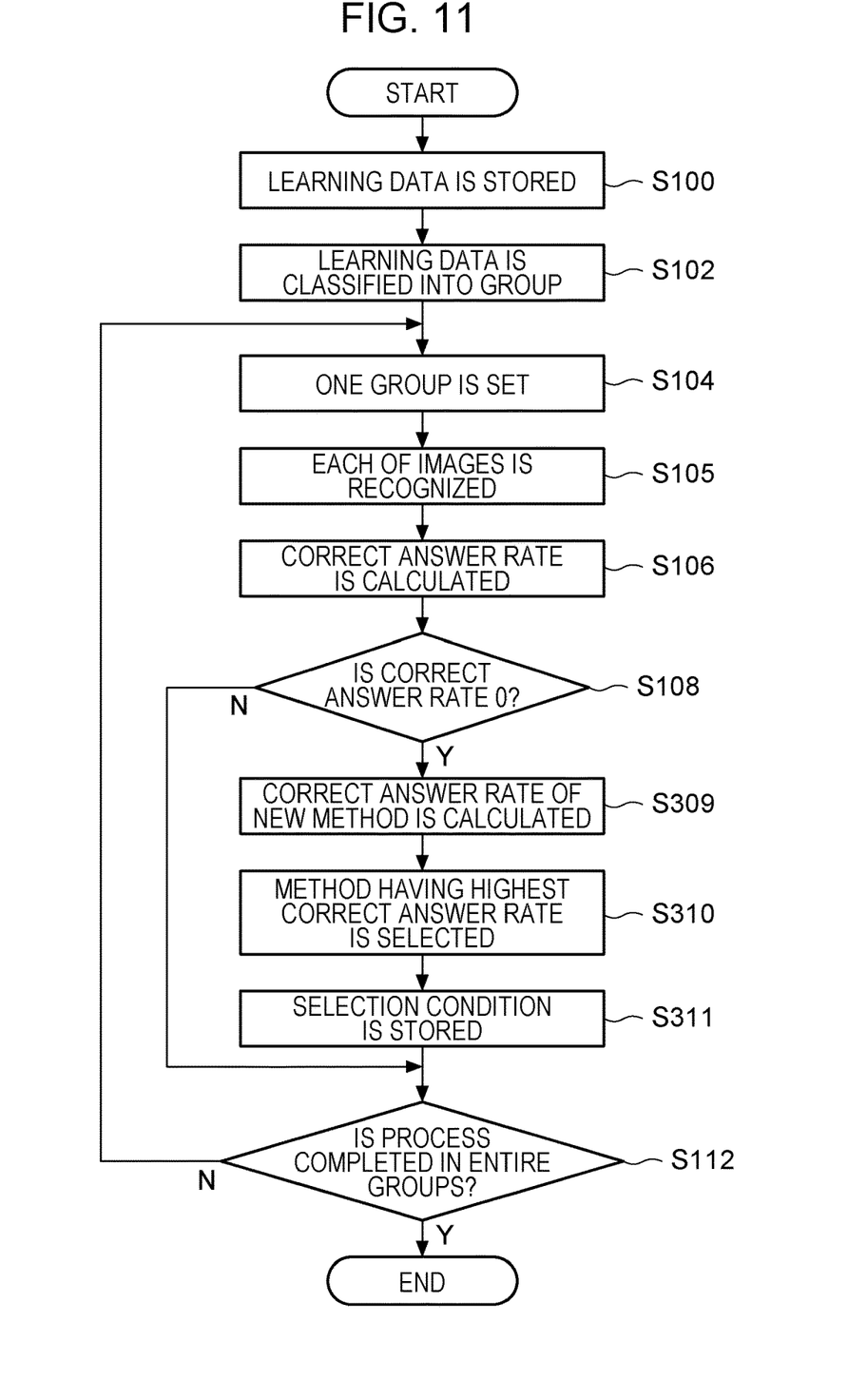
FIG. 11 is a flowchart illustrating an example of a selection condition setting process in a second embodiment.

First, a setting process of setting the selection condition of feature will be described. In the image processing apparatus 10 according to the second embodiment, when a plurality pieces of learning data are input and each piece of the learning data received by the reception unit 14 is stored in a table of the data storage unit 16, the selection condition setting process illustrated in FIG. 11 is performed in the image processing apparatus 10.

Step S100 to step S108 are performed in the same manner as those of the first embodiment.

In step S309, the recognition unit 22 recognizes each of the images that belong to a group, for which it is determined that recognition fails in step S108, by employing each of the plurality of new methods of recognition. The recognition unit 22 acquires the correct answer rate of images that belong to the group, for which it is determined that recognition fails in step S108, for each of the plurality of new methods of recognition.

In step S310, the setting unit 24 selects, for the group for which it is determined that recognition fails in step S108, a new method of recognition having the highest correct answer rate among the correct answer rates acquired with respect to the plurality of new methods of recognition in the step S309.

In step S311, the setting unit 24 stores the new method of recognition to be employed to recognize images that belong to the group for which it is determined that recognition fails in step S108 and the selection condition of feature for employing the new method in the selection condition table of the selection condition storage unit 26.

Step S112 is performed in the same manner as that of the first embodiment and the selection condition setting process is completed.

Next, the image recognition process will be described. In the image recognition apparatus 30 according to the second embodiment, when the recognition target image is input, the image recognition process illustrated in FIG. 10 is performed in the image processing apparatus 10.

Step S200 to step S206 are performed in the same manner as those of the first embodiment.

In step S208, the selection unit 38 selects a new method of recognition based on the group determined in step S206 by referring to the selection condition table stored in the selection condition storage unit 36.

Step S210 and step S212 to step S214 are performed in the same manner as those of the first embodiment.

As described above, the image processing apparatus according to the second embodiment recognizes each of the images classified into a group by employing each of a plurality of new methods of recognition when setting a new method to be employed in recognition. The image processing apparatus sets which of the plurality of new methods of recognition is to be employed for recognition, based on each of correct answer rates of recognition performed by the plurality of new methods. As a result, when new methods of recognition are introduced, the recognition accuracy for images that are incorrectly recognized by the old method may be improved while suppressing that the new methods fail to recognize an image that is correctly recognized by the old method.

In the above description, although the image processing program 60 is stored (installed) in the storage unit 53 in advance, and the image recognition program 90 is stored (installed) in the storage unit 83 in advance is described, the embodiments are not limited thereto. The programs related to the embodiments may also be provided in a form recorded on a recording medium such as a compact disc read-only memory (CD-ROM), a digital versatile disc read-only memory (DVD-ROM), and a universal serial bus (USB) memory.

Next, exemplary modifications of the embodiments will be described.

In the embodiments, although a case where the image processing apparatus and the image recognition apparatus are configured as different apparatuses is described, the image processing apparatus and the image recognition apparatus may be configured as one apparatus.

In the embodiments, although a case where the average luminance and the average edge intensity are used as the feature of an image is described, the embodiments are not limited thereto, and other features may be used. In addition, types of the features to be used may be one or may be three or more.

In the embodiments, although a case where the average luminance is classified into two groups, the average edge intensity is classified into two groups, and the image is classified into four groups based on the feature of an image is described, the embodiments are not limited thereto. For example, in a case where average luminance is classified into four groups, images may be classified into four groups based on the feature of the images by setting values 64, 128, and 192 of average luminance as thresholds.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
    a memory; and
    a processor coupled to the memory and the processor configured to:
    classify each of a plurality of images into one of a plurality of groups based on a feature of each of the plurality of images;
    store first information in the memory, wherein a first recognition method is associated with a first group in the first information and at least one image classified into the first group is correctly recognized by the first recognition method; and
    store second information in the memory, wherein one of at least one second recognition method different from the first recognition method is associated with a second group in the second information and no images classified into the second group are correctly recognized by the first recognition method.

2. The image processing apparatus according to claim 1, wherein
    the processor is further configured to:
    receive, as the plurality of images, input of a plurality pieces of learning data for which a correct answer of each image of the plurality of images is known; and
    classify each of the plurality pieces of learning data into one of the plurality of groups based on a feature of each image of the plurality of images.

3. The image processing apparatus according to claim 1, wherein
    the at least one second recognition method includes a plurality of second recognition methods, and
    the processor is further configured to:
    recognize images classified into the second group by employing each of the plurality of recognition methods; and
    associate, in the second information, one of the plurality of recognition methods with the second group based on a correct answer rate obtained by each of the plurality of recognition methods.

4. The image processing apparatus according to claim 1, wherein
    the processor is further configured to:

receive input of a recognition target image;

identify a group, among the plurality of groups, based on a feature of the recognition target image; and recognize the recognition target image by employing a recognition method associated with the identified group based on information stored in the memory.

5. An image recognition apparatus, comprising:

a memory; and a processor coupled to the memory and the processor configured to:

receive input of a recognition target image;

identify a group, among a plurality of groups, based on a feature of the recognition target image; and recognize the recognition target image by employing a recognition method that is associated with the identified group based on information stored in the memory, the recognition method including a first method and a second method, the second method employed to recognize the recognition target image when no images included in the group are recognized by the first method.

6. A non-transitory computer-readable recording medium having stored therein a program that causes a computer to execute a process, the process comprising:

classifying each of a plurality of images into one of a plurality of groups based on a feature of each of the plurality of images;

storing first information in a memory, wherein a first recognition method is associated with a first group in the first information and at least one image classified into the first group is correctly recognized by the first recognition method; and storing second information in the memory, wherein one of at least one second recognition method different from the first recognition method is associated with a second group in the second information and no images classified into the second group is incorrectly recognized by the first recognition method.

7. The non-transitory computer-readable recording medium according to claim 6, the process further comprising:

receiving, as the plurality of images, input of a plurality pieces of learning data for which a correct answer of each image of the plurality of images is known; and classifying each of the plurality pieces of learning data into one of the plurality of groups based on a feature of each image of the plurality of images.

8. The non-transitory computer-readable recording medium according to claim 6, wherein the at least one second recognition method includes a plurality of second recognition methods, and the process further comprises:

recognizing classified into the second group by employing each of the plurality of recognition methods; and associating, in the second information, one of the plurality of recognition methods with the second group based on a correct answer rate obtained by each of the plurality of recognition methods.

9. The non-transitory computer-readable recording medium according to claim 6, the process further comprising:

receiving input of a recognition target image;

identifying a group, among the plurality of groups, based on a feature of the recognition target image; and recognizing the recognition target image by employing a recognition method associated with the identified group based on information stored in the memory.

* * * * *